Patented Sept. 19, 1922.

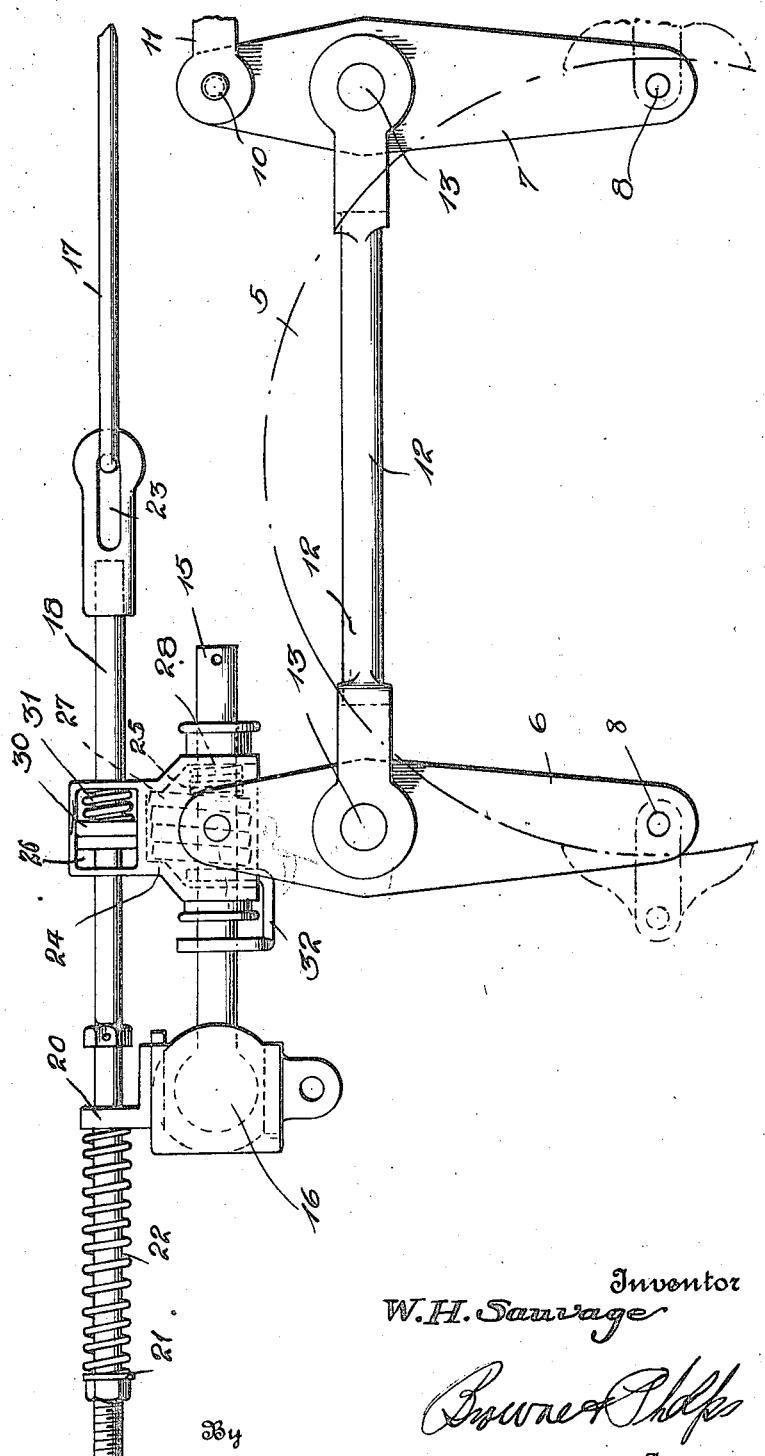

1,429,640

UNITED STATES PATENT OFFICE.

WILLIAM H. SAUVAGE, OF FLUSHING, NEW YORK, ASSIGNOR, BY MESNE ASSIGNMENTS, TO GOULD COUPLER COMPANY, OF NEW YORK, N. Y.

SLACK ADJUSTER.

Application filed February 6, 1920. Serial No. 356,750.

*To all whom it may concern:*

Be it known that I, WILLIAM H. SAUVAGE, a citizen of the United States, residing at Flushing, Long Island, in the county of Queens and State of New York, have invented certain new and useful Improvements in Slack Adjusters, of which the following is a specification.

This invention relates to improvements in slack adjusters, and more particularly that type of slack adjusters adapted to be associated with truck brake rigging of railway vehicles.

One of the objects of the present invention is to provide a simple and practical slack adjuster applicable to brakes of the clasp type such as on six wheel trucks, for example, although it is of course to be understood that various features thereof are applicable to other parts of the brake rigging.

Another object of the invention is to provide a relatively inexpensive slack adjuster of the above character which may be easily manufactured and assembled.

Other objects will be in part obvious and in part hereinafter pointed out in connection with the annexed sheet of drawings forming part of this specification, wherein is shown such parts of the brake rigging and slack adjuster mechanism in elevation as is necessary to understand the invention.

In brake mechanisms of the six wheel truck clasp type it is believed to be sufficient to show just one wheel 5 of the truck, it being understood that each corner of the truck is provided with a dead lever 6 and a plurality of live levers 7. The lower ends of these levers are provided with pivots 8 which are connected with the struts of brake beams carrying brake shoes in the usual manner. It is believed, however, to be unnecessary to show them in detail, as they are part of a well-known structure.

The upper part of the live lever 7 is pivotally connected at 10 with a pull rod 11 which is connected with the upper end of the next dead lever and the mechanism of levers herein shown is repeated in its broadest aspect until the main source of power is reached at the end of the truck. It will be sufficient for this disclosure to consider the pull rod 11 as being connected with the source of power direct.

Interposed between and pivoted at points about the central parts of the live and dead levers is a connecting rod 12 pivotally connected with each lever at 13. The upper part of the dead lever 6 is pivotally connected with a housing 24 which may be considered as a relatively fixed point except in so far as its position changes when it is necessary to take up the slack due to excess travel caused by wear of the parts and more particularly the brake shoes. This housing is adapted to slide along a push rod 15 supported in fixed position at 16 on any desired part of the truck framing. An adjusting rod 17 is also connected with the main source of power adjacent the point of connection with the pull rod 11 whereby they move together. It will be noted that the adjusting rod 17 is formed in two parts, the other part 18 being slidably mounted in a lug 20 on the bracket 16 and provided at its end with a nut 21 between which nut and lug 20 is a return spring 22. The parts 17 and 18 are also provided with a slotted lost motion connection 23 whereby a certain amount of movement of the rod 17 may take place before that movement is communicated to the slack adjuster mechanism proper. As herein shown the rod 17 is in its outward or applied position, as it normally drops back to the left hand end of this slot 23 on release of the brakes.

As herein shown the temporary and permanent take up and holding mechanism comprises a housing 24 forming two chambers 25 and 26. In the chamber 25 are a plurality of dogs 27 of usual construction, that is, sheet metal plates provided with openings through which the pivot rod 15 is adapted to pass. These are normally held in canted position or in biting engagement with the rod 15 by means of a coil spring 28. A second set of dogs, at 30 positioned horizontally with respect to the vertically disposed dogs 27 and off-center with respect to rod 15, is mounted in the chamber 26, and also held in canted position by means of spring 31 surrounding the rod 18, in such manner that the rod is in sliding engagement with the dogs when moved to the right, but in biting engagement with them when moved to the left. As the strain on these dogs is comparatively small, one dog 30 will frequently answer the purpose. These dogs are provided with enlarged openings for rod 18 in order that the spring 31 may hold them in canting position.

A release device 32 is provided upon the rod 15 whereby on relative movement towards the right it will move the dogs 27 to a position at right angles to the rod 15 whereby the member 24 may be moved to the position necessary for applying new brake shoes.

The operation of this device is as follows:

On application of the brakes power is first transmitted through the pull rod 11 to bring the shoes carried by the live and dead levers into engagement with the periphery of the wheel 5. Simultaneously the rod 17 will be moved to the position shown, that is, at the right end of the slot 23. If excess travel occurs the rod 18 will be pulled through the dog 30 and the spring 22 compressed an amount corresponding to the excess travel. The dogs 27, however, are in biting engagement and occupy a fixed position with respect to the rod 15 during the application of the brakes. When the brakes are released the rod 17 first drops back its clearance distance as provided for by the slot 23 simultaneously with the movement of the rod 18 towards the left under the action of the return spring 22. Under these circumstances, however, the dogs 30 maintain their biting engagement with the rod 18 and the housing member 24 is carried relatively towards the left an amount corresponding to the excess travel, as the dogs 27 are free to slip along the rod 15 in this left hand direction but are prevented from movement in the opposite direction. In this manner all the slack is taken up at each application and release of the brakes.

When it is necessary to apply new brake shoes to the wheels, the dogs 27 are released by pushing device 32 against the dogs 27 with sufficient force to overcome the opposing force of the spring 28 and the member 24 moved toward the right to the end of the push rod 15. The shoes are then applied and on the first application of the brakes the entire system will be adjusted to take up all of the excess travel exceeding the clearance provided for by the slot 23.

This release device, therefore, is for the purpose of releasing the biting engagement of the dogs 27 when it becomes necessary to apply new brake shoes, and is not a part necessary for the release of the dogs during the usual braking operation, when the dogs occupy a canted position and are normally held in such position by the spring 28 having a sliding engagement with the rod 15. Upon release of the brakes the housing 24 moves towards the left with the rod 18 having a biting engagement with the rod 15 and upon release of the brakes the rod 18 moves in the opposite direction in sliding engagement with the dogs 30. The device 32 is intended only for an auxiliary service, which is not part of the braking operation and is slidably mounted on the rod 15, but will not, of itself, overcome the canting force of the spring 28 on the dogs 27. For that purpose the part 32 must be pushed by a force independent of the brake equipment and sufficient to overcome the canting force of the spring 28.

It will thus be seen that the present invention provides a reliable and efficient slack adjuster mechanism of simple, practical and inexpensive structure, particularly applicable to the clasp type brake rigging of railway trucks.

Considerable variation of the details as described herein may be resorted to without departure from the spirit of the invention which is to be construed in the light of the following claims:—

What I claim is:—

1. In a slack adjuster mechanism, in combination, live and dead levers mounted at opposite sides of a wheel adapted to have a clasping action thereon, a fixed push rod, a housing carried thereby, positive holding means interposed between the dead lever and the push rod permitting free movement in one direction only, and an adjusting rod having positive holding means cooperating with said first mentioned positive means said second mentioned position holding means adapted to be moved during application of the brakes and adapted to sufficiently move the first mentioned positive means on release of the brakes.

2. In a slack adjuster mechanism, in combination, live and dead levers arranged at opposite sides of a wheel, permanent take up and holding means associated with the dead lever, including a housing, a push rod, and positively acting means between the housing and rod, an adjusting rod, positively acting means carried by said first housing for coacting with said adjusting rod, said positively acting means permitting relative movement of the housing in one direction along the push rod, and a relative movement of the adjusting rod in the opposite direction.

3. In a slack adjuster mechanism, in combination, live and dead levers, permanent take up and holding means associated with the dead lever, including a push rod and positively acting take up means, an adjusting rod parallel with the push rod, positively acting means interposed between the dead lever and the adjusting rod, a lost motion device permitting predetermined movement of the adjusting rod without affecting the slack adjuster mechanism, and spring means for insuring operation of the slack adjuster mechanism when excess travel occurs.

4. In a slack adjuster mechanism, in combination, live and dead levers at one side of a wheel for exerting clasp brake action, a push rod and an adjusting rod occupying substantially parallel relation, and a member associated with the dead lever carrying positively acting means operating on both the push rod and the adjusting rod whereby relative free movement of one may take place in one direction and a similar movement of the other in the opposite direction, thereby to permanently take up and hold the excess travel.

5. In a slack adjuster mechanism, in combination, live and dead levers at one side of a wheel for exerting clasp brake action, a push rod, and an adjusting rod occupying substantially parallel relation, a member associated with the dead lever carrying positively acting means operating on both the push rod and the adjusting rod whereby relative free movement of the adjusting rod may take place in one direction and a similar movement on the push rod in the opposite direction, thereby to permanently take up and hold the excess travel, and spring means associated with one of said rods adapted to insure operation of the slack adjuster when excess travel occurs.

6. In a slack adjuster mechanism, in combination, live and dead levers associated with a truck wheel to exert clasping action thereon, a fixed push rod mounted on the truck, an adjusting rod slidably supported in substantially parallel relation thereto, a lost motion device associated with the adjusting rod whereby it is actuated after a predetermined brake shoe clearance is taken up, a member associated with the upper end of said dead lever and provided with positive take up and holding means coacting with the push rod, and temporary take up and holding means coacting with the adjusting rod.

7. In a slack adjuster mechanism, in combination, live and dead levers associated with a truck wheel to exert clasping action thereon, a fixed push rod mounted on the truck, an adjusting rod slidably supported in substantially parallel relation thereto, a lost motion device associated with the adjusting rod whereby it is actuated after a predetermined brake shoe clearance is taken up, a member associated with the upper end of said dead lever and provided with positive take up and holding means coacting with the push rod, temporary take up and holding means coacting with the adjusting rod, and spring means adapted to be distorted on excess travel of the brake rigging and to insure operation of the positive take up and holding means on release of the brakes.

8. In a slack adjuster mechanism, in combination, live and dead levers associated with a truck wheel to exert clasping action thereon, a fixed push rod mounted on the truck, an adjusting rod slidably supported in substantially parallel relation thereto, a lost motion device associated with the adjusting rod whereby it is actuated after a predetermined brake shoe clearance is taken up, a member associated with the upper end of said dead lever and provided with positive take up and holding means coacting with the push rod, spring means adapted to be distorted on excess travel of the brake rigging and to insure operation of the positive take up and holding means on release of the brakes, said spring means comprising a coil spring acting between a fixed part of the truck frame and a fixed member on the movable adjusting rod.

9. In a slack adjusting mechanism, in combination, live and dead levers adapted to exert a clasping action on a truck wheel, a fixed support, a push rod mounted thereon, an adjusting rod parallel thereto, a positive take up and holding means acting between the push rod and the end of the dead lever, and temporary take up and holding means acting between the end of the dead lever and the adjusting rod, a lost motion device, spring means adapted to be distorted when travel exceeds that permitted by the lost motion device, thereby to insure an operation of the permanent take up and holding means on such excess travel.

10. In a slack adjuster mechanism, in combination, live and dead levers adapted to exert a clasping action on a truck wheel, a fixed support, a push rod mounted thereon, an adjusting rod parallel thereto, a positive take up and holding means acting between the push rod and the end of the dead lever, and temporary take up and holding means acting between the end of the dead lever and the adjusting rod, a lost motion device, spring means adapted to be distorted when travel exceeds that permitted by the lost motion device, thereby to insure an operation of the permanent take up and holding means on such excess travel, and means for releasing the holding action of said take up and holding mechanism when it is desired to apply new brake shoes.

In testimony whereof I affix my signature in the presence of two witnesses.

WILLIAM H. SAUVAGE.

Witnesses:
 DONALD C. DAVIS,
 ALFRED E. OTT.